(No Model.)
J. R. HAMILTON.
COMBINED SHOULDER AND NECK PAD FOR HORSE COLLARS.
No. 252,032. Patented Jan. 10, 1882.
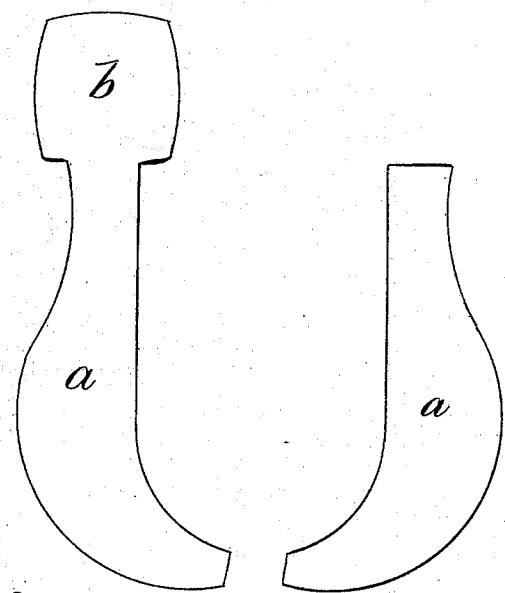
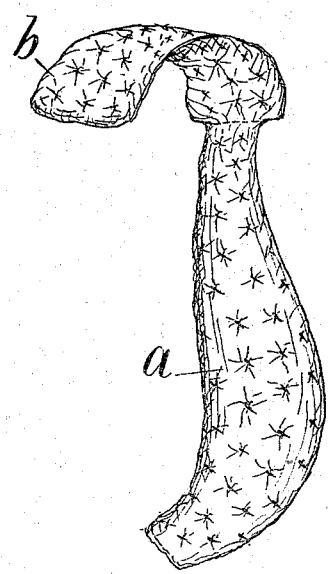
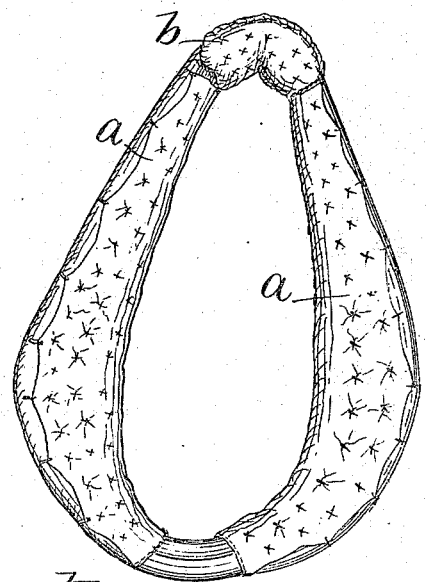
Witnesses:
R. G. Orwig.
Fred. Hampton.
Inventor:
James R. Hamilton,
By Thomas G. Orwig, Atty

UNITED STATES PATENT OFFICE.

JAMES R. HAMILTON, OF MILO, IOWA.

COMBINED SHOULDER AND NECK PAD FOR HORSE-COLLARS.

SPECIFICATION forming part of Letters Patent No. 252,032, dated January 10, 1882.

Application filed July 19, 1881. (No model.)

*To all whom it may concern:*

Be it known that I, JAMES R. HAMILTON, of Milo, in the county of Warren and State of Iowa, have invented a Combined Neck and Shoulder Pad to be Attached to Horse-Collars, of which the following is a specification.

My invention relates to that class of stuffed pads made of cloth or canvas, and detachably connected with a horse-collar to absorb sweat and prevent chafing.

Heretofore two counterpart sections adapted in size and shape to be fitted to the inside faces and swells of the collar, that engage the shoulders of a horse, and a third section adapted to fit in the upper and contracted part of the same collar, to engage the top of the horse's withers and neck, have been formed in three distinct pieces; but it is difficult to attach and keep in place neck-pads formed separately; and my improvement consists in constructing a shoulder-pad and neck-pad jointly, as hereinafter fully set forth, to facilitate the application of the complete collar-pad, and to aid in maintaining that part that is designed to protect the top of the animal's neck in proper position relative to the collar and the animal.

Figure 1 of my accompanying drawings is a diagram showing the forms of the blanks required to make my combined neck and shoulder pad. Fig. 2 is a perspective view of the combined neck and shoulder pad ready to apply to a collar. Fig. 3 is a perspective view, showing the complete pad applied to a collar. Together they clearly illustrate the construction, application, and operation of my complete invention.

$a$ $a$ in Fig. 1 represent the counterpart sections of a breast-pad of common form. $b$ $b$ are extensions formed integral with the upper ends of the sections, and adapted in shape to produce a neck-pad when sewed together and stuffed. By simply sewing together the edges of these counterpart blanks $a$ $b$ and then stuffing and stretching them to retain the stuffing in proper position a complete pad is produced that will extend over the shoulder of an animal, and also over the neck, and that will be less liable to become displaced and inoperative than when the shoulder-pad and neck-pad are each formed complete and distinct.

$c$ (shown in Fig. 3) is a breast-pad of common form, applied to a collar, in combination with my combined breast and neck pad, by means of stitches or ties at various points along its edges, or in any suitable way.

I claim as my invention—

The improved horse-collar pad, consisting of the sections $a$ and $a$ $b$, constructed substantially as shown and described, to apply and operate in the manner set forth, for the purposes specified.

JAMES R. HAMILTON.

Witnesses:
J. F. GOODE,
S. W. SQUIRES.